UNITED STATES PATENT OFFICE.

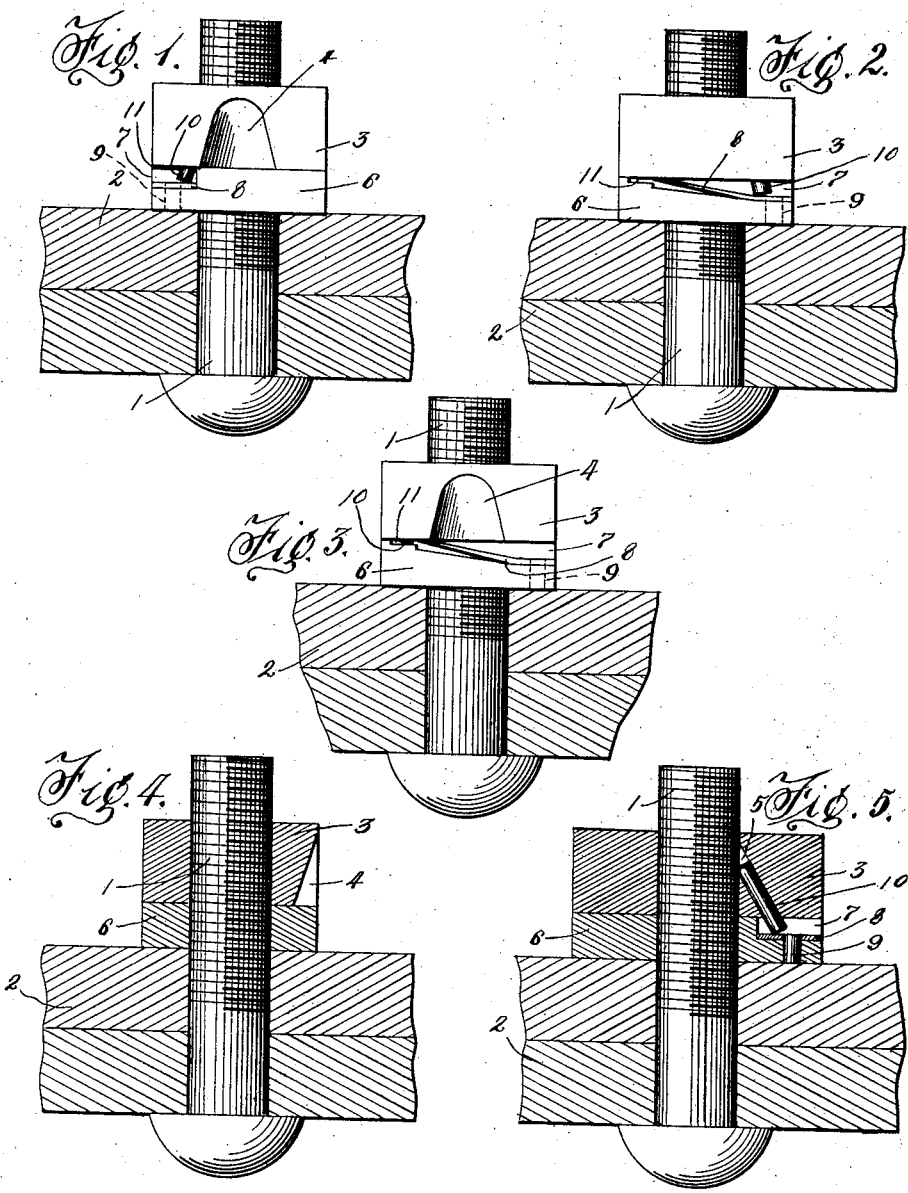

CHARLES RADCLIFFE, OF BARNESBORO, PENNSYLVANIA.

NUT-LOCK.

No. 919,212.  Specification of Letters Patent.  Patented April 20, 1909.

Application filed February 20, 1909. Serial No. 479,119.

*To all whom it may concern:*

Be it known that I, CHARLES RADCLIFFE, a citizen of the United States of America, residing at Barnesboro, in the county of Cambria and State of Pennsylvania, have invented certain new and useful Improvements in Nut-Locks, of which the following is a specification, reference being had therein to the accompanying drawing.

This invention relates to nut locks, and the prime object thereof is to provide a simple device that can be easily and quickly placed in position to lock a nut upon a bolt. A device of this character in order to be practical must not only be inexpensive to construct, but it is of the utmost importance that the structure be such as will not injure the bolt or nut and will permit of a nut being removed and further used.

It is the principal object of the present invention to provide a nut lock that combines the desirable features above pointed out.

Another feature of the present invention is the adaptation of a nut locked to rail joints and structures subject to vibratory stresses and strains, it being impossible to accidentally dislodge the nut after being properly locked by my device.

The invention will be hereinafter described in detail, and reference will now be had to the drawings, wherein there is illustrated the preferred embodiments of the invention, but it is to be understood that the structural details thereof can be varied or changed without departing from the spirit or scope of the invention.

In the drawings, Figure 1 is a plan of a nut lock constructed in accordance with my invention, Fig. 2 is a side elevation of the same with the nut unlocked, Fig. 3 is a similar view with the nut locked, Fig. 4 is a longitudinal sectional view of the nut lock, and Fig. 5 is a longitudinal transverse sectional view of the same.

In the drawings, 1 designates a bolt extending through material 2 and adapted to screw upon said bolt is a nut 3. The nut 3 in cross section is rectangular and upon one side is provided with a recess 4, the object of which will hereinafter appear. The nut 3 is provided with an angularly disposed opening 5, one end of said opening terminating in the threaded bore of the nut, while the opposite end terminates at the inner face of the nut. In connection with the nut, a washer 6 is used, which is placed upon the bolt prior to the nut. One edge of the washer 6 is cut away, as at 7, to accommodate a flat spring 8 secured to the washer 6 by a rivet 9 or similar fastening means. For locking the nut relative to the washer, a pin 10 is used, said pin being mounted in the opening 5 of the nut to engage the threaded end of the bolt 1.

The manner of assembling the nut lock is as follows;—After the washer 6 is placed in position, the nut 3 is started upon the bolt and just before reaching the washer 6, the pin 10 is inserted in the opening 5 from the inner end of said opening. To retain the pin 10 within the opening, the washer 6 is moved into engagement with the nut, and said nut and washer rotate together until the washer 6 engages the material 2. By further rotating the nut upon the bolt, the end of the pin 10 travels over the spring 8 while the opposite end of the pin is forced into engagement with the threaded end of the bolt. When the pin reaches the seat 11 of the washer 6 the spring 8 is released and locks the end of the pin upon the seat 11.

Should it be desired to unlock the nut 3 a suitable instrument can be placed in the recess 4 to engage a spring 8 and press the same downwardly, until the nut 3 has been moved sufficiently to carry the end of the pin 10 off of the seat 11 onto said spring. The recess 4 simply provides clearance for an instrument to firmly engage the spring 8.

Having now described my invention, what I claim as new, is;—

1. In a nut lock, the combination with a bolt, and a nut adapted to screw upon said bolt, said nut having an angularly disposed opening formed therein terminating in the threaded bore of said nut, of a washer loosely mounted upon said bolt, said washer being cut away, a spring mounted in the cut away portion of said washer, a pin arranged in the opening of said nut and adapted to be forced into engagement with said bolt by a rotating movement of said nut and locked in engagement with said bolt by said spring, and means in connection with said nut whereby easy access can be had to the spring of said washer for releasing said pin.

2. In a nut lock, the combination with a bolt, and a nut adapted to screw upon said bolt, said nut having an angularly disposed opening formed therein terminating in the threaded bore of said nut, of a washer loosely mounted upon said bolt, said washer being cut away, a spring mounted in the cut away portion of said washer, and a pin arranged in the opening of said nut and adapted to be forced into engagement with said bolt by a rotative movement of said nut and locked in engagement with said bolt by said spring.

In testimony whereof I affix my signature in the presence of two witnesses.

CHARLES RADCLIFFE.

Witnesses:
Mrs. E. CASSIDY,
MAX H. SROLOVITZ.